United States Patent
Feiring et al.

(10) Patent No.: US 6,773,805 B1
(45) Date of Patent: Aug. 10, 2004

(54) METHOD FOR PROTECTION OF STONE WITH SUBSTANTIALLY AMORPHOUS FLUOROPOLYMERS

(75) Inventors: Andrew Edward Feiring, Wilmington, DE (US); William Howard Tuminello, Laramie, WY (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/332,550

(22) PCT Filed: Jul. 5, 2001

(86) PCT No.: PCT/US01/21270

§ 371 (c)(1),
(2), (4) Date: Jun. 20, 2003

(87) PCT Pub. No.: WO02/04383

PCT Pub. Date: Jan. 17, 2002

Related U.S. Application Data

(60) Provisional application No. 60/216,617, filed on Jul. 7, 2000.

(51) Int. Cl.[7] .......................... B32B 27/30; B32B 31/24; B32B 33/00
(52) U.S. Cl. ...................... 428/336; 428/421; 428/540; 427/393.6
(58) Field of Search .................................. 428/336, 421, 428/540; 526/247; 524/544; 427/393.6

(56) References Cited

U.S. PATENT DOCUMENTS

| 4,499,146 A | 2/1985 | Piacenti et al. |
| 4,745,009 A | 5/1988 | Piacenti et al. |
| 4,746,550 A | 5/1988 | Strepparola et al. |
| 4,764,431 A | 8/1988 | Piacenti et al. |
| 4,923,720 A | 5/1990 | Lee et al. |
| 5,290,604 A | 3/1994 | Nielsen |

FOREIGN PATENT DOCUMENTS

| JP | 62-185740 | * 8/1987 |

OTHER PUBLICATIONS

English translation of JP 62–185740, Aug. 1987.*
Ridrigues, et al. 7th International Congress on Deterioration and Conservation of Stone, Polyfluoroure. Jun. 15, 1992, pp. 1277–1288, vol. 3, Italy.

* cited by examiner

Primary Examiner—Ramsey Zacharia

(57) ABSTRACT

This invention concerns the application of substantially amorphous fluoropolymer compositions to stone so as to protect the stone from the deleterious effects of water and pollution.

14 Claims, No Drawings

METHOD FOR PROTECTION OF STONE WITH SUBSTANTIALLY AMORPHOUS FLUOROPOLYMERS

This application claims the benefit of 60/216,617 filed Jul. 7, 2000.

FIELD OF THE INVENTION

This invention concerns the application of substantially amorphous fluoropolymer compositions to stone in order to protect the stone from the deleterious effects of water and pollution. This invention is useful for the preservation of historic monuments, buildings, and sculptures and for the construction of weather and pollution resistant stone construction materials.

TECHNICAL BACKGROUND OF THE INVENTION

It has long been recognized that a combination of man-made and natural atmospheric conditions are having deleterious effects on stone structures including many monuments of considerable artistic and historical importance. A variety of efforts have been undertaken over the years to identify ways to protect and preserve these structures, but these efforts have met with only partial success. Most recently, a well-organized and concerted effort has been undertaken by Franco Piacenti and his coworkers, with sponsorship from the Target Project for the Cultural Heritage of the Consiglio Nazionale della Recerche of Rome, Italy, and represents the current state of the art.

The deleterious effects of water, in the form of both rainfall and condensation, are of primary concern, although organic pollutants are also of concern. For example, all building materials are subject to stress and concomitant cracking resulting from penetration by water followed by cycles of freezing and thawing. Also, water in combination with $CO_2$, which occurs naturally, and nitrous and sulfurous gases, which are man-made pollutants, form acids which rapidly eat away at the stone.

A successful attack on the problem will necessitate some tradeoffs. While it is highly desirable to minimize the contact between water and stone, by achieving maximum water repellency, it is also necessary to provide high water vapor permeability in order to permit venting of that water which finds its way into the microstructure of the stone. Substances with high permeability to water vapor are often not those of the highest water repellency. High resistance to acid and abrasion are also of considerable importance. Furthermore, cost of materials is a factor in any practical application. And, for several reasons, the smaller the amount of material required to achieve the desired effect, the better.

There are other tradeoffs. For example, it is particularly desirable that the coating material coat but preferably not block the pores. To achieve this, a coating viscosity should be in a range which permits wetting of the pores via capillary action. High wetting is also required to ensure thorough and uniform coverage. However, the coating must be provided with sufficient adhesion to the outside surface upon which it is deposited that at least some amount will remain thereon.

Other requirements for such materials include chemical inertness, low volatility, photooxidative stability and thermal stability. There should also be sufficient solubility in environmentally friendly solvents for the purposes of both application and subsequent removal if warranted. The coating must also be clear and colorless, and remain so for its lifetime. In the current state of the art, the application solvent of choice is supercritical $CO_2$, as described in Carbonell et al., WO 99/19080.

In a series of patents, U.S. Pat. No. 4,499,146, U.S. Pat. No. 4,746,550, U.S. Pat. No. 4,745,009, U.S. Pat. No. 4,902,538, Piacenti et al. disclose compositions based upon perfluoropolyethers having molecular weights in the range of 500–5000 for use in the protection of stone from the effects of water and atmospheric pollutants. In the art of Piacenti, excellent combinations of water repellency and water vapor permeability are achieved.

In U.S. Pat. No. 4,902,538, good results are achieved in compositions having highly crystalline particles of polytetrafluoroethylene and copolymers thereof intermixed with the perfluoropolyethers. However, when stone of porosity of greater than ca. 30% is treated, impractically high levels of coating material are required to achieve the desired coverage with the desired water repellency. Levels in the range of at least 150 g/m² are disclosed, more than 10 times the amount required for low-porosity marble. The effect of this high coating level on permeability is not disclosed. Its effect on cost, however, is clearly undesirable. Furthermore, use of highly crystalline polymers, such as polytetrafluoroethylene, is undesirable because, unless they are sintered at high temperatures, they will be too readily susceptible to removal from the treated surface by abrasion and erosion. Further still, they are not readily soluble in the delivery medium of choice, $CO_2$, or any other desirable medium.

Also disclosed in the art in Piacenti et al., U.S. Pat. No. 4,764,431, are copolymers of vinylidene fluoride which are less effective than the perfluoropolyethers.

Fluorinated acrylic polymers are disclosed by Ciardelli et al., Prog. in Org. Coatings, 32, 43–50 (1997). The polymers disclosed therein are characterized by hydrocarbon backbones and fluorinated pendant groups. These polymers exhibit similar functionality to the perfluoropolyethers.

Guidetti et al. disclose the use of polyfluorosubstantially amorphous fluoropolymers for protecting stone in "Polyfluorosubstantially amorphous fluoropolymers as stone protectives", 7th International Congress on Deterioration and Conservation of Stone, 1053–62 (1992).

There is considerable incentive in the art to discover new materials which possess several of the above attributes desired for the application

SUMMARY OF THE INVENTION

The present invention provides a process for protecting stone comprising: contacting stone with a substantially amorphous fluoropolymer, comprising, repeat units of the formulas

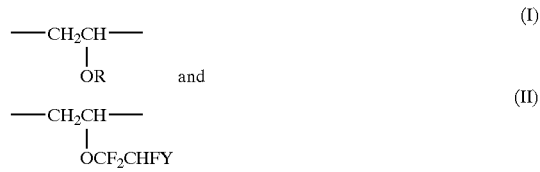

wherein: Y is fluorine, hydrogen, chlorine, a perfluoroalkyl radical having 1–8 carbon atoms, or a perfluoroalkoxy radical having 1–8 carbon atoms, the radicals optionally substituted by one or more ether oxygens; R is hydrogen or —C(O)R¹ where R¹ is hydrocarbyl or substituted hydrocarbyl; with the proviso that the molar ratio of (I):(II) is in the range of 1:1 to 1:10.

DETAILED DESCRIPTION

For the purpose of the present invention, the term "stone" means a natural stone used in construction or sculpture (such as granite, marble, limestone, or sandstone) as well as tile, cement, brick, stucco, and the like.

The method of the present invention provides surprising benefits over the methods of the art. In the method of the present invention, a substantially amorphous fluoropolymer composition is employed as a coating agent for stone in order to provide high liquid moisture barrier, good moisture vapor permeability, and resistance to environmental pollutants. The non-fugitive, very low areal density coating formed on the stone surface is surprisingly effective over the materials of the art. Furthermore, the substantially amorphous fluoropolymer of the present invention is readily soluble in a variety of solvents by virtue of its amorphous nature, and is thereby both readily applied in the form of an environmentally friendly solution and readily removed by conventional solvents should that be deemed necessary after application. Further still, the highly desirable effects of the method of the present invention are achieved employing a substantially amorphous fluoropolymer in relatively small quantities in order to achieve the desired combination of water vapor permeability and liquid water resistance.

The polymers suitable for use in the present invention are substantially amorphous, in contrast to most fluorinated polymers in common use which are known to be moderately to highly crystalline. One of skill in the art will appreciate that the degree of polymer crystallinity which can be tolerated in a given situation will depend upon the specific polymer structure, solvents, other adjuvants, application methods, requisites of the particular application, and substrate in a given practical embodiment of the invention. For the purpose of the present invention, substantially amorphous polymers suitable for the practice of the invention may exhibit a melting endotherm having an associated heat of fusion no greater than 5 J/g, preferably no greater than 2 J/g, more preferably no greater than 1 J/g, at a temperature above about 20° C.

More preferably the polymers employed for the practice of the invention will exhibit no melting endotherm above about 100° C. Most preferably the polymers employed for the practice of the invention will exhibit no melting endotherm whatever.

For the purpose of the present invention, the heat of fusion is determined by differential scanning calorimetry (DSC) at a heating rate of 10° C./min, according to ASTM D4591–97.

DSC is also the technique of choice for determining the glass transition temperature. Glass transition temperatures of the polymer are preferably no higher than 30° C., most preferably no higher than 20° C. Glass transitions should be set by the methods herein described so that the polymer will not undergo repeated transitions while in place on the stone.

In the present invention, stone is contacted with a substantially amorphous fluoropolymer, comprising repeat units of the formulas

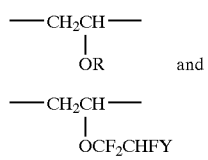

wherein: Y is fluorine, hydrogen, chlorine, perfluoroalkyl, perfluoroalkoxy, optionally substituted by one or more ether oxygens R is hydrogen or —C(O)R$^1$ where R$^1$ is hydrocarbyl or substituted hydrocarbyl; with the proviso that the molar ratio of (I):(II) is in the range of 1:1 to 1:10.

One of skill in the art will appreciate that not all of the compositions possible according to the above formulas will necessarily meet the requirements of being "substantially amorphous" as defined herein. For example, were tetrafluoroethylene (TFE) employed as a comonomer, one of skill in the art would know that there will be a maximum concentration of TFE above which excessive crystallinity will develop. One of ordinary skill in the art can readily determine a suitable composition.

Preferably Y is fluorine or a perfluoroalkyl radical; most preferably Y is fluorine or perfluoropropoxy. Preferably R is H.

In one preferred embodiment, R is H, Y is —C$_3$F$_7$, and the preferred ratio of I:II is in the range of 3:4 to 1:7. In a second preferred embodiment, R is H, Y is F, and the preferred ratio of I:II is in the range of 1:3 to 1:7.

The polymers suitable for use in the present invention may conveniently be synthesized by grafting a fluoro-olefin to a hydroxy-containing hydrocarbon polymer in the presence of a catalytic amount of base according to the process described in U.S. Pat. No. 5,847,048, which is incorporated herein by reference.

Suitable fluorinated olefins have the formula CF$_2$=CFY, wherein Y is selected from the group consisting of fluorine, hydrogen, chlorine, perfluoroalkyl, and perfluoroalkoxy, optionally substituted by one or more ether oxygens; R is hydrogen or —C(O)R$^1$ where R$^1$ is hydrocarbyl or substituted hydrocarbyl; with the proviso that the molar ratio of (I):(II) is in the range of 1:1 to 1:10. In preferred fluorinated olefins Y is fluorine, a perfluoro-n-alkyl radical or a perfluoro-n-alkoxy radical, the radicals having 1–8 carbons, most preferably perfluoropropoxy.

The base used in the process has a conjugate acid whose pKa is about 14 or more, preferably about 16 or more. The pKa of these conjugate acids may be measured by methods know in the art, see for instance F. G. Bordwell, Acc. Chem.Res., vol. 21, p. 456–463 (1988). Useful bases include the alkali metal hydroxides, alkali metal hydrides, and alkali metal alkoxides. A particularly preferred base is potassium t-butoxide. The base is preferably relatively non-nucleophilic.

By a catalytically effective amount of base is meant a sufficient amount of base to form enough alkoxide anions on the polymer to permit the reaction to proceed at a reasonable rate, but not so much that side reactions occur. Although not critical for the process, it has been found that about 1–10 mole percent of the base, based on the limiting reactant (hydroxyl groups on the polymer or fluorinated olefin) in the process, is a useful range.

The temperature at which the process is carried out is not critical, the main factors to be considered are reaction rate and minimization of side reactions. A useful temperature range is about −20° C. to about 100° C., preferably about 0° C. to about 60° C., more preferably about ambient temperature (about 20° C. to about 30° C., but the reaction is exothermic, and some heating may occur).

The reaction may be carried out with the neat ingredients, especially if the fluorinated olefin is a liquid. However, it is preferred to carry out the process in a liquid which is a solvent for the hydroxyl containing polymer. The solvent should preferably not contain hydroxyl or other relatively acidic groups that may react with the base that is present. Polar solvents such as dimethylsulfoxide and N,N-dimethylformamide are useful herein.

It is preferred to conduct the grafting process under an inert gas blanket, such as nitrogen. The process may be exposed to the air, but absorption of water vapor may lead to a loss of the activity of the catalytic base.

The hydroxyl containing polymer may be any polymer which contains hydroxyl groups which are bound to saturated carbon atoms. By a saturated carbon atom is meant a carbon atom that is bound to four other atoms. Thus, the hydroxyl group is essentially synonymous with an alcohol hydroxyl. The hydroxyl containing polymer should not contain groups (other than the hydroxyl) groups that substantially react with the base that is present. Thus, relatively strongly acidic groups on the polymer should be avoided. These acidic groups, in some instances, may be neutralized so that the reaction is allowed to proceed. For example carboxyl groups present on the polymer can be converted to their alkali metal salts; and later converted back to carboxyl groups by acidification. It is also preferred that the hydroxyl containing polymer not contain substantial amounts of esters, since these may hydrolyze to give acids which will neutralize the basic catalyst. If esters are present care should preferably be taken to run the process under anhydrous conditions. Useful polymers include poly(vinyl alcohol) (PVA) or copolymers of vinyl alcohol and polymers containing a repeat unit which contains a hydroxyl group such as polymeric carbohydrates.

A preferred hydroxyl containing polymer is PVA. PVA is usually made by polymerizing vinyl acetate and then partially or essentially completely hydrolyzing the acetate ester groups to hydroxyl groups. By PVA is meant a polymer in which at least 50 mole percent of the acetate ester groups are hydrolyzed, preferably at least 90% are hydrolyzed, and more preferably essentially "all" of the acetate groups are hydrolyzed.

When "completely" hydrolyzed PVA is grafted with the fluorinated olefin, a polymer containing repeat units (I) and (II), in which R is H, is obtained. In one preferred form of the grafted polymer, all of the R groups are hydrogen. In another preferred form, at least 1 mole percent, more preferably at least 3 mole percent, and especially preferably at least 5 mole percent of R are hydrogen.

Polymers in which some or all of the R groups are —C(O)R$^1$ can be made by starting with only partially hydrolyzed PVA and/or by reaction of the grafted polymer with a carboxylic acid anhydride. R$^1$ is hydrocarbyl or substituted hydrocarbyl.

By hydrocarbyl is meant a univalent group containing only carbon and hydrogen, while substituted hydrocarbyl is a univalent group containing carbon and hydrogen, and substituted with one or more groups or subsdituents. Useful substituted groups include halo, oxo, ether, thioether, and tertiary amino. It is preferred that R$^1$ is alkyl, especially methyl.

Polymers containing repeat units (I) and (II) may also contain other repeat units. These polymers may generally be made by copolymerizing vinyl acetate (or another vinyl ester) with the monomer that yields the other desired repeat unit(s), hydrolyzing the ester groups, and then grafting on the fluorinated olefin. Useful comonomers include TFE, ethylene, vinyl chloride, acrylic acid and methacrylic acid. In the latter two instances it would be necessary to use enough base to neutralize the carboxylic acid groups. The synthesis of such vinyl acetate copolymers is known, see for instance B. Elvers et al., Ed., Ullmann's Encyclopedia of Industrial Chemistry, Vol. A 22, 5.sup.th Ed., VCH Verlagsgesellschaft mbH, Weinheim, 1993, p. 7–8.

The grafted polymers, especially grafted PVA polymers, are easily prepared in a single step from commercially available starting materials. Sometimes the polymers may develop some color during the grafting reaction; this color may be removed by treatment with a bleaching agent such as hydrogen peroxide. PVA polymers containing 40 to 80% tetrafluoroethoxy side chains are amorphous plastics and soluble in inexpensive organic solvents, such as acetone or THF allowing ready formation of clear films or coatings with low refractive indices. The refractive index is readily controlled by the amount of fluoroalkyl ether substitution.

For the purposes of the present invention, the polymer is preferably a low-viscosity liquid at the temperature of the stone surface to which it is applied in order to enhance the uniformity of coating and achieve good coating distribution in a matter of minutes to hours. The desired degree of liquidity is achieved when the glass transition temperature of the substantially amorphous polymer of the invention is below the temperature of application. Additionally, the viscosity of the liquid polymer is determined in part by molecular weight, with lower molecular weight generally associated with lower viscosity. However, when a solvent is employed during the application of the coating, low molecular weight and low glass transition temperature enhance the solubility of the polymer in the chosen solvent. In order to achieve the benefits of the present invention the number average molecular weight of the polymer must be at least 1000 Da, and preferably no more than about 5000 Da, as determined by such methods as are known in the art of polymer physics such as gel permeation chromatography, intrinsic viscosity, or light scattering.

In one embodiment, the polymer suitable for the practice of the invention is a liquid, and may be applied to a stone surface directly, without dilution However, it is preferred to first dissolve the polymer in a solvent to achieve the optimum control over uniformity and thickness of coating. In the preferred embodiment, wherein (I) is a monomer unit of vinyl alcohol (that is, R is H) it is preferred that the vinyl alcohol moiety be present at concentrations no greater than 30 mol-% in order to provide high solubility particularly in $CO_2$.

Coatings formed from the polymer of the invention are particularly useful because of the inherent properties of the polymer, such as being substantially amorphous (polymer is transparent), having low surface energy (and hence poor wetting by water or most organic liquids) while exhibiting high surface coverage of stone, having low dielectric constant, having low index of refraction, having low coefficient of friction, having low adhesion to other materials, etc.

In the practice of the present invention, one or more of the substantially amorphous fluoropolymers hereinabove described is applied by any convenient method to the surface of the stone which is to be protected from the effects of water and environmental pollutants. It is important that the coating provide a barrier to liquid water with minimal effect on the aural water vapor permeability of the stone. One way of achieving this is to provide a durable coating in as thin a layer as possible on the wall surface of each pore of the stone without actually filling or blocking the pore. This is achieved by using a material of the lowest possible surface tension. Coating materials which exhibit a desirable combination of properties are characterized by pendant groups comprising fluorinated functional groups in sufficient concentration that the surface presented to incident liquid water such as rainfall is characterized by a high density of the perfluorinated groups and a consequently very low surface tension. In the most preferred embodiments, the polymer suitable for the practice of the present invention comprises more than 50 mol-% of monomer units having highly fluorinated alkoxy pendant groups. The resulting low surface tension is the source of the thermodynamic driving force for complete wetting of the pores in stone as well as for the liquid water repellency of the coated stone. To reduce the kinetic barrier to complete pore wetting, the viscosity should be as low as possible. This represents a particularly desirable attribute of the method of the present invention because the substantially amorphous fluoropolymer employed in the method of the present invention readily forms low viscosity solutions in a number of convenient solvents.

It is estimated that the viscosity of the coating during application of the coating to the stone is preferably less than about 10 Pa-s to achieve optimum coating performance. It will be obvious to one of skill in the art that while it is desirable to employ materials which afford low viscosity solutions, usually associated with low molecular weight or non-polymeric materials, the materials so employed cannot be of such low molecular weight that they evaporate from the stone surface.

It is further preferred that polar groups should be present in the coating material to promote adhesion of the coating material to the stone surface and decrease the tendency of the coating material to continually penetrate to the interior of the stone and reducing surface efficacy in terms of liquid water repellency. The alcohol groups in the preferred embodiment provide significant polarity to the coating of the present invention According to the method of the present invention, the substantially amorphous fluoropolymer can be dissolved in a solvent which acts as a volatile diluent in the spraying operation to afford fast penetration at the early stages of coating while providing a high degree of control over the viscosity, the uniformity of coating and the coating thickness.

Solvents suitable for the practice of the present invention include acetone, methyl-ethyl ketone, ethyl acetate, t-butyl acetate, chlorofluorocarbons, hydrochlorofluorocabons, hydrofluorocarbons and perfluorocarbons. The solubility of the polymer compositions suitable for the practice of the present invention can vary significantly depending on the nature of the R and Y groups. For example, with R=H and Y=F, the polymers are soluble in all the above except for perfluorocarbons. When R=H and Y=$OC_3F_7$, the polymers are insoluble in polar organic solvents such as acetone, THF, ethyl acetate and soluble in perfluorocarbons. For any given polymer composition, solubility can be determined by simple tests as known by those of skill in the art. In the most preferred embodiment, the substantially amorphous fluoropolymer, having less than 30 mol-% of vinyl alcohol moieties, is dissolved in supercritical $CO_2$ according to the methods described in Carbonell et al., WO 99/19080 or in the alternative described in U.S. Pat. Nos. 4,923,720; 5,108, 799; 5,290,603; and 5,290,604.

Spray-coating of stone is preferably effected from $CO_2$ solutions of 75 weight % or less polymer at 40° to 70° C., 2000 to 4000 psi. To promote polymer absorption into the stone it might also be preferable to add up to about 40 weight % acetone, t-butyl acetate, Oxol 100 (4-chlorobenzotrifluoride), chlorofluorocarbons, hydrochlorofluorocarbons, hydrofluorocarbons, perfluorocarbons or other such diluents to the substantially amorphous fluoropolymer or similar diluents to the substantially amorphous fluoropolymer.

It will be understood by one of skill in the art that numerous chemical compounds have been identified which may serve as the supercritical fluid for the substantially amorphous fluoropolymer coating composition of the invention. However, $CO_2$ is by far the preferred compound because of the low cost, low toxicity, ready formation of a supercritical fluid, and low environmental impact.

The substantially amorphous fluoropolymer component of the coating composition is generally present in amounts ranging from 1 to 80 weight percent, based upon the total weight of the coating composition. Preferably, the substantially amorphous fluoropolymer component should be present in amounts ranging from about 15 to about 70 weight percent on the same basis.

The supercritical fluid diluent should be present in such amounts that a liquid mixture is formed that possesses such a viscosity that it may be applied as a liquid spray. Generally, this requires the mixture to have a viscosity of less than about 300 centipoise at spray temperature. Preferably, the viscosity of the mixture of components ranges from about 5 centipoise to about 150 centipoise. Most preferably, the viscosity of the mixture of components ranges from about 10 centipoise to about 50 centipoise. Centipoise is a unit of viscosity and is one hundredth of a poise. A poise is one dyne per square centimeter. See Grant and Hackh's Chemical Dictionary, Fifth Ed. McGraw-Hill Book Company, 1987.

The supercritical carbon dioxide fluid is most preferably present in amounts ranging from about 30 to about a 85 weight percent on the total compositional weight, thereby producing a mixture having viscosities from about 10 centipoise to about 50 centipoise at spray temperature.

It is not necessary to form a preliminary solution or dispersion of the preferred substantially amorphous fluoropolymer composition in order to form a low-viscosity solution or dispersion suitable for mixing with the $CO_2$. It is however optional to add a third component to the coating composition of the invention, the third component comprising one or more solvents employed for the purpose of improving viscosity control during spraying and "laydown" of the coating material on the stone.

The solvents suitable for the practice of the most preferred embodiment of the invention generally include any solvent or mixture of solvents that is miscible with $CO_2$, is a good solvent for the substantially amorphous fluoropolymer, and is fugitive at the temperature at which the coating is being applied to the stone, normally at temperatures of about 0° C. or above. Preferably, the solvent is also environmentally friendly. Suitable solvents include acetone, methyl-ethyl ketone, ethyl acetate, t-butyl acetate, chlorofluorocarbons, hydrochlorofluorocarbons, hydrofluorocarbons, and perfluorocarbons.

The coating composition of the invention is sprayed onto a substrate to form a liquid coating thereon by passing the liquid mixture under pressure through an orifice into the environment of the substrate to form a liquid spray.

Spray orifices, spray tips, spray nozzles, and spray guns used for conventional airless and air-assisted airless spraying of coating formulations such as paints, lacquers, enamels, and varnishes, are suitable for spraying the coating composition of the present invention. The spray pressure used in the practice of the present invention is a function of the specific coating formulation. In the case of supercritical fluid solutions, the minimum spray pressure is at or slightly below the critical pressure of the supercritical fluid. Generally the pressure will be below 5000 psi. Preferably, the spray pressure is above the critical pressure of the supercritical fluid and below 3000 psi. If the supercritical fluid is supercritical carbon dioxide fluid, the preferred spray pressure is between 1070 psi and 3000 psi. The most preferred spray pressure is between 1200 psi and 2500 psi.

The spray temperature used in the practice of the present invention is a function of the coating formulation. The minimum spray temperature is about 31° C. The maximum temperature is determined by the thermal stability of the components in the liquid mixture. The preferred spray temperature is between 35° C. and 90° C. The most preferred temperate is between 45° C. and 75° C. Generally liquid mixtures with greater amounts of supercritical carbon dioxide fluid require higher spray temperatures.

The method of the present process, while specifically directed to the protection of stone, may be usefully employed to apply coatings to a variety of substrates. Examples of suitable substrates include but are not limited to metal, wood, glass, plastic, paper, cloth, ceramic, masonry, stone, cement, asphalt, rubber, and composite materials.

Through the practice of the present invention, coatings may be applied to substrates in thicknesses of from about 0.5 to 100 micrometers. Preferably, the coatings have thicknesses of from about 1.0 to about 15 micrometers, while most preferably, their thicknesses range from about 1.5 to about 10 micrometers.

The method of the present invention provides a considerable benefit in that the substantially amorphous fluoropolymer coating may be readily removed using solvents such as acetone, methyl-ethyl ketone, ethyl acetate or t-butyl acetate, chlorofluorocarbons, hydrofluorochlorocarbons, hydrofluorocarbons, or perfluorocarbons if it should be deemed desirable at some point in time following the application thereof.

The coatings on stone produced by the practice of the present invention are highly beneficial to the purpose of protecting the stone from environmental degradation. Two key attributes which are indicative of susceptibility to weathering are water absorption, typically by capillary action through the porous stone structure, and water vapor permeation rate. It is highly desirable that the water absorption of normally highly absorbent stone be reduced by as large a factor as possible, while water vapor permeability, normally high as well, be maintained at a high level. The coated stone of the present invention provides high levels of water vapor permeability by virtue of the thin coatings which are found to be effective in providing the desired high resistance to water penetration.

The method of the present invention and the properties of the coated stone compositions provided thereby are further illustrated in the following specific embodiments.

EXAMPLES

In the following examples, a pressure cell as described in Tuminello et al., J. Appl. Polym. Sci., 56, 495 (1995), was used to evaluate the solubility of the substantially amorphous fluoropolymer specimens below in $CO_2$. The total volume of the cell was about 3.0 ml. Solid fluorinated material solute sufficient to make about a 17 volume percent solution was added to the cell first. A vacuum was applied for a few minutes and then liquid $CO_2$ was added until the cell was filled at its vapor pressure, about 6.2 MPa (900 psi). Pressures could be increased to as high as 31.7 MPa (4600 psi) by pushing a piston through a manifold loaded with $CO_2$. Temperature was increased to as high as 100° C. with an electrical heating band around the pressure chamber. Temperatures as low as about −10° C. were achieved by removing the heating band and packing dry ice around the cell. Cloud points were determined by visual observation through the sapphire windows provided on the cell. The cloud point was determined at constant temperature with decreasing presume and is defined as that pressure at which the mixture became so opaque that it was no longer possible to see the stirring paddle inside the cell. Cloud point data for each sample are listed below.

In the following examples, the procedures followed in determining water absorption and permeability were essentially those described in Italian standard test methods AA.VV, Assorbimento di acqua per capillarità, Raccomandazione NORMAL 11/85, CNR-ICR, Roma 1985 and 7 AA.VV, Permeabilità al vapor d'acqua, Raccomandazione NORMAL 121/85, CNR-ICR, Roma 1985.

Two stone substrates were employed, each in the form of prism-shaped specimens 5×5×2 cm in size. They were:
 (a) Marble—White Carrara marble with grey veins, 99% calcite, polygonal structure and fine grains. Total porosity=3.83±0.2%; saturation index=7.4±0.6%.
 (b) Biocalcarenite—Lecce stone composed of Foraminifera with calcareous shell, glauconite grains and very small fragments of quartz. The clasts are bound by a micritic calcitic cement with a low clay content. Total porosity=32 to 40%; saturation index=65±5.0%.

In each example, the average of the results obtained on three separate prism shaped specimens was determined. Five untreated stone specimens of each type were retained as controls. The stone specimens were maintained in a dessicator containing $CaCl_2$ until a constant mass was reached using a lab balance of precision of ±1mg.

The coating was applied to one face of each stone specimen by painting with a brush as uniformly as possible. This was done after removing the stone from the dessicator. Coating thickness was determined by weighing before and after treatment. The painted stone specimens were then left at room temperature in ambient air for one week to evaporate the solvent and then placed in a dessicator along with the control specimens containing $CaCl_2$ until constant mass was achieved.

Each stone specimen thus brought to constant mass, was removed in turn from the dessicator and placed in contact with a stack of filter paper (1 cm thick; 9 cm diameter) soaked in distilled water. The amount of water absorbed by capillarity was determined by weighing the sample after a fixed time (marble—60 min.; biocalcarenite—20 min.) Protective efficacy (EP%) was calculated by the following expression:

$$Ep\ \% = \frac{(A_{UN} - A_T)}{A_{UN}} \cdot 100$$

where $A_{UN}$ and $A_T$ are the amounts of water absorbed by the untreated and treated samples, respectively.

In the ideal there would be no water absorption, or $E_p\%=100$. In the current state of the art, a very good level of efficacy is considered to be 80 to 90%.

Each stone test specimen was mounted as a lid to a poly(vinyl chloride) test cell containing 10 ml of distilled water. The cell was equipped with neoprene gaskets to keep the sample in place while leaving an area of about 16 $cm^2$ through which water vapor could permeate. The cell was then placed in a thermostatic drybox maintained at a constant temperature of 25.0±0.5° C., and containing a sufficient amount of silica gel and calcium chloride to maintain constant relative humidity of 2 to 5%.

A balance was placed in the drybox to monitor weight changes in the cell without the need to open the drybox. The weight of each cell was monitored every 24 hours for several days. Weight loss became constant after a few days. The permeability (P) of the surface of the stone to water vapor was calculated using:

$$P = M/A (g/m^2 \text{ in } 24 \text{ hrs.})$$

where M is the amount of water, in grams, lost in 24 hours and A is the evaporating area, in m², of the system.

The reduction in permeability ($R_p\%$) due to the treatment is defined as:

$$Rp\ \% = \frac{(P_{UN} - P_T)}{P_{UN}} \cdot 100$$

where $P_{UN}$ and $P_T$ are the permeability of the untreated and treated samples, respectively. The best performance is to have permeability matching that of the untreated sample, or $R_p\%=0$.

Examples 1 and 2

A dry 2-L flask was swept with nitrogen and charged with 26.4 g of polyvinyl alcohol (weight-average molecular weight of 13000–23000, obtained from the Aldrich Chemical Company) and 750 mL of dry DMSO. This mixture was heated in an oil bath at 95–98° C. to effect solution, then cooled to room temperature. A 1.0 M solution of potassium tert-butoxide in THF (30 mL) was added and the solution was sired for 10 min. Perfluoropropylvinyl ether (DuPont, 208 g, 0.78 mole) was added rapidly from an addition funnel using an ice/acetone bath to control the resulting exotherm and limit the temperature rise to 37° C. After addition was complete, the resulting mixture was stirred for 24 hr at room temperature. Glacial acetic acid (100 mL) was added and the solution was decanted from the precipitated polymer. The precipitated mass was washed twice with water, dissolved in 1.5 L of 1,1,2-trichlorotrifluoroethane, filtered and concentrated on a rotary evaporator to a tan mass. Acetone (1.2 L) was added, followed by 35 ml of 30% hydrogen peroxide and the resulting mixture was refluxed for 20 hr with mechanical stirring. The mixture was cooled to room temperature and the liquid was decanted away from a solid polymer mass. The polymer was washed twice with water, dissolved in 1.2 L of 1,1,2-trichlorotrifluoroethane, filtered and concentrated on a rotary evaporator to about 500 mL of a thich syrup. This was added slowly to 3-L of hexane resulting in precipitation of a gum which was dried at 40° C. and 0.05 mm in a vacuum oven to give 133 g of polymer comprising —$CH_2CH(OH)$— and —$CH_2CH(OCF_2CHFOCF_2CF_2CF_3)$—groups. By elemental analysis for % C, it was calculated that about 76 mole % of the OH groups in the starting polymer have been converted to fluoroether groups. The glass transition temperature was found by differential scanning calorimetry to be −10.8° C.

$CO_2$ solubility was determined according to the method hereinabove described, and the results are shown in Table 1.

TABLE 1

$CO_2$ Solubility

| Temperature(° C.) | Cloud Point (psi) |
|---|---|
| 4 | <1200 |
| 10 | 1400 |
| 25 | 2300 |

1 g of the solid polymer prepared above was dissolved in 99 g of 1,1,2-trichlorotrifluoroethane at room temperature. The resulting solution was applied to three stone specimens each of the white Cararra marble (Example 1) and Lecce stone (Example 2), as hereinabove described. The specimens were allowed to stand for 1 week, after which they were subject to the procedures of dessication, water absorption determination, and water vapor permeability according the methods hereinabove described. Results are shown in Table 2.

Comparative Example 1

$CF_3$—[$CF(CF_3)CF_2O$]m—($CF_2O$)n—$CF_3$

The test procedures of Example 1 were followed employing Fomblin® YR, a perfluorinated polyether available from Ausimont/Montefluos, Montedison/Montefluos Group, Milano, Italy. Fomblin® YR is the material currently preferred in commercial stone preservation applications. Stone test specimens were prepared and tested as hereinabove described. Only the biocalcarenite was tested. The amount of material applied was that followed in current commercial practice. Results are in Table 2.

TABLE 2

Results of Coating on Stone

| Example | Substrate | Coverage (g/sq.m.) | Protective Efficacy (Ep %)* | Reduction in Permeability (Rp %)** |
|---|---|---|---|---|
| 1 | Marble | 5.8 ± 0.11 | 81 ± 4 | 28 |
| 2 | Biocalcarenite | 8.0 ± 1.0 | 90 ± 1 | 30 |
| Comp. Ex.1 | Biocalcarenite | 49 | 18 | Not Determined |
| Control | Marble | None | 0 | 0 |
| Control | Biocalcarenite | None | 0 | 0 |

*Goal is 100%
**Goal is 0%

Comparative Example 2

Following the method described in F. Piacenti and M. Camaiti, 3. Fluorine Chem., 69 (1994), 227–235, the monofunctional acid fluoride precursor of a random perfluoropolyether of similar structure to the one in Comparative Example 1 was esterified and then condensed with hexamethylene diamine to form the diamide functionalized perfluoropolyether material with a MW of about 1800 Da. This material is considered the state of the art for providing a combination of high water repellency and low water permeability, as described in F. Piacenti, "The Conservation of Monumental Buildings: Recent Scientific Developments", a lecture presented at the 2nd International Congress on Science and Technology for the Safeguard of Cultural Heritage in the Mediterranean Basin —Paris—Jul. 5 to 9, 1999.

Biocalcarenite specimens were coated with 48 g/m² of the perfluoro-polyether diamide so prepared according to the methods of Comparative Example 1. Ep. was 55% as determined as hereinabove described.

What is claimed is:

1. A process for protecting stone comprising:

contacting stone with a substantially amorphous fluoropolymer comprising, repeat units of the formulas

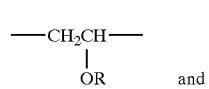

(I)

and

-continued

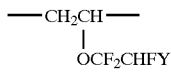
(II)

wherein: Y is fluorine, hydrogen, chlorine, a perfluoroalkyl radical or a perfluoroalkoxy radical, said radicals having 1–8 carbons and being optionally substituted by one or more ether oxygens, R is hydrogen or —C(O)R$^1$ where R$^1$ is hydrocarbyl of substituted hydrocarbyl, with the proviso that the molar ratio of (I):(II) is in the range of 1:1 to 1:10.

2. The Process of claim 1 wherein R is hydrogen.

3. The process of claim 2 wherein Y is a perfluoro-n-alkoxy radical or fluorine.

4. The process of claim 1 wherein the substantially amorphous fluoropolymer is characterized by a glass transition temperature of less than or equal to 30° C.

5. The process of claim 2 wherein the concentration of (I) in the substantially amorphous fluoropolymer does not exceed 30 mol-%.

6. The process of claim 1 further comprising forming a solution of said substantially amorphous fluoropolymer prior to contacting said stone therewith, wherein said stone is contacted with said solution of said substantially amorphous fluoropolymer.

7. The process of claim 6 wherein said solution comprises supercritical CO$_2$.

8. The process of claim 7 wherein said solution further comprises a solvent which is fugitive at a temperature at or above about 0° C.

9. The process of claim 8 wherein said solvent is selected from the group consisting of acetone, methylethyl ketone, ethyl acetate, t-butyl acetate, hydrochlorofluorocarbons, chlorofluorocarbons, hydrofluorocarbons and perfluorocarbons.

10. A composition comprising stone and a substantially amorphous fluoropolymer in the form of a coating on said stone, said fluoropolymer comprising, repeat units of the formulas

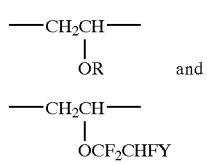

wherein: Y is fluorine, hydrogen, chlorine, a perfluoroalkyl radical, or a perfluoroalkoxy radical, said radicals having 1–8 carbons atoms and being optionally substituted by one or more ether oxygens, R is hydrogen or —C(O)R$^1$ where R$^1$ is hydrocarbyl or substituted hydrocarbyl; with the proviso that the molar ratio of (I):(II) is in the range of 1:1 to 1:10.

11. The composition of claim 10 wherein R is hydrogen.

12. The composition of claim 10 wherein Y is a perfluoro-n-alkoxy radical or fluorine.

13. The composition of claim 10 where said coating has a thickness in the range of 1.5 to 10 micrometers.

14. The composition of claim 10 wherein the substantially amorphous fluoropolymer is characterized by a glass transition temperature of less than or equal to 30° C.

* * * * *